UNITED STATES PATENT OFFICE.

WILLIAM N. BLAKEMAN, JR., OF NEW YORK, N. Y.

OIL.

No. 883,522.

Specification of Letters Patent.

Patented March 31, 1908.

Application filed March 2, 1907. Serial No. 360,155.

*To all whom it may concern:*

Be it known that I, WILLIAM N. BLAKEMAN, Jr., a citizen of the United States, and resident of the borough of Manhattan, in the city, county, and State of New York, have invented a new and useful Improvement in Oils, which invention is fully set forth in the following specification.

My invention relates to the oil known as tung oil (sometimes called Chinese wood oil) and its object is so to treat tung oil that when used, either alone or mixed with other oils, as a drier for paints, or as a medium for grinding pigments to paste form, or as a vehicle for grinding pigments to paint form, the result in all cases will be the production of a very quick drying and otherwise satisfactory compound. I accomplish this object by rancidifying the tung oil, and this rancidification may be effected by any suitable method, such as by exposing the oil in broad surfaces to the action of air and light until it has rancidified and responds to the Kreis test for rancidity (*Chemiker Zeitung*, 1899, Vol. 23, p. 802). As, however, this method will be found a very slow one and may require several months exposure, depending upon climatic conditions, I prefer to hydrate the oil before exposing it to air and light, as I have found that such hydration will shorten, very greatly, the time necessary for rancidification. The hydration of the oil may be effected by suspending the oil in a suitable vessel over a body of water with a covering arranged to retain a vaporous atmosphere in contact with the oil; or by placing the oil in a vessel having about one per cent. of distilled water on the bottom, and exposing this vessel to light, with frequent gentle agitation, until the water has been absorbed and combined with the oil; or by placing the oil in a vessel with about two per cent. of water distributed on the bottom, and then subjecting it to a heat of about 150° Fahr., with frequent gentle agitation, until the water has been absorbed and combined with the oil, which will require from 10 to 15 hours, or longer, the time depending upon the quantity of water, the contact area, and the agitation. This latter method of hydration is the one I prefer to employ, but no matter which method is employed, the oil, after hydration, should be exposed in broad surfaces to the action of air and light until rancidification has set in which will require from 8 to 10 days, the shorter period if the oil be exposed to continuous bright sunlight. The tung oil, before being rancidified, and either before or after hydration, may be oxidized by any suitable method of oxidation, such as by heating it on oxidizers; or by submitting it with heat to the action of pure oxygen under pressure; or by passing through it, with heat, thoroughly dried air; or by incorporating with it any highly oxidized body with which it is miscible such as boiled linseed oil, manganese resinate, elaidinized oil, and the like.

When the tung oil responds to the Kreis test for rancidity it is in condition for use, and in this condition it will be found to constitute a very rapid drier for paints, either alone or mixed with other oils. It may also be used, either alone or mixed with other oils, as a medium for grinding pigments to paste form, or as a vehicle for grinding pigments to paint form. Instead of using the rancidified tung oil alone for any of these purposes, I prefer to combine it with another oil, such as linseed oil. The oil with which the rancidified tung oil is so combined, may if desired, be either oxidized, or hydrated, or rancidified, by any of the methods above described, or it may be elaidinized by being subjected to the action of an oxid of nitrogen; or it may be subjected to two or all of these treatments; the result being the production of a quicker-drying compound when combined with the rancidified tung oil.

When my rancidified tung oil is used in any of the ways above described, it will be found to impart spreading power and quick drying properties to all those pigments which ordinarily are deficient in spreading power and drying qualities when ground in the usual linseed oil vehicle, such as zinc oxid; zinc sulfid; lead carbonate; lead sulfate; lead sulfite; barium sulfate; barium carbonate, calcium carbonate; strontium sulfate; strontium carbonate; the new process white lead, of which Matheson lead is an example; and the various combinations of zinc and lead resulting from furnace sublimation, and known commercially as sublimed lead, oxysulfate of lead, zinc lead, and other trade names; and a paint compound produced by grinding one or more of these pigments in conjunction with my rancidified tung oil, will be found to be equal in physical respects and superior in chemical results to the usual compound of Dutch white lead in linseed oil. I prefer to use the rancidified tung oil as a medium for grinding the pigment to paste form; and, if for example, 120 parts of zinc oxid be ground to paste form with 12 parts of rancidified tung oil, and this paste afterwards extended to paint form with 90 parts of linseed oil, the paint so produced will, with the usual quantity of commercial liquid drier added, follow the brush in a smooth, homogeneous and uniform film and dry in about 4¼ hours in stormy weather at a temperature of 40° Fahr.

The rancidity imparted to the tung oil, and the proportion of rancidified tung oil employed may be varied in practice, and will depend largely upon the character of the pigment with which it is to be used. Dense or heavy pigments, like the lead salts, will require less rancidity than a light or bulky pigment like zinc white, and hence the oil should either not be so highly rancidified or else a smaller percentage of the rancidified oil should be combined with the pigment. It is obvious that, in rancidifying the oil, if the exposure to light and air be continued after the oil first responds to the Kreis test for rancidity, the rancidity will be intensified and a more highly rancidified oil produced; and hence, by regulating the exposure, any desired degree of rancidity may be obtained. In no event, however, should the exposure be continued until the oil assumes a solid or semi-solid condition as it will then no longer be miscible with other oils, and will be useless for my purpose. The rancidity necessary for a particular pigment can be easily determined in practice by testing the oil with the pigment to ascertain if the requisite spreading power and drying properties are exhibited.

I do not claim, in this application the combination of my rancidified tung oil with a pigment, the same being covered by the claims in my pending applications No. 216,567, filed July 14, 1904; No. 301,569, filed February 17, 1906; No. 302,986, filed February 26, 1906; and Nos. 321,632, 321,634 321,636 and 321,637, filed June 14, 1906.

Any suitable commercial or other drier may be used in conjunction with the rancidified tung oil, if desired. Heat, pressure, and agitation may be employed whenever deemed advisable.

Having thus fully described my invention, I claim:—

1. As a new composition of matter, tung oil, hydrated and rancidified.
2. A compound or mixture of rancidified tung oil, and another oil.
3. A compound or mixture of rancidified tung oil, and a hydrated oil.
4. A compound or mixture of rancidified tung oil; another oil; and a drier.
5. A compound or mixture of rancidified tung oil; a hydrated oil; and a drier.

WM. N. BLAKEMAN, Jr.

Witnesses:
FRANCIS P. REILLY,
MABEL O. FAHNESTOCK.